United States Patent
Di Benedetto et al.

(10) Patent No.: US 6,987,740 B1
(45) Date of Patent: Jan. 17, 2006

(54) STP ROOT GUARD

(75) Inventors: Marco Di Benedetto, Santa Clara, CA (US); Ramana Mellacheruvu, San Jose, CA (US); Umesh Mahajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 867 days.

(21) Appl. No.: 09/658,880

(22) Filed: Sep. 11, 2000

(51) Int. Cl.
*H04L 12/28* (2006.01)

(52) U.S. Cl. ............... 370/256; 370/235; 370/252; 370/255; 370/401; 370/422; 370/423; 370/424

(58) Field of Classification Search ............... 370/252, 370/253, 255, 256, 401, 463, 392, 414, 416, 370/418–419, 423, 433–434, 235, 422, 424
See application file for complete search history.

(56) References Cited

U.S. PATENT DOCUMENTS

| | | | |
|---|---|---|---|
| 5,450,486 A * | 9/1995 | Maas et al. ............ 379/399.01 |
| 6,032,194 A | 2/2000 | Gai et al. | |
| 6,188,694 B1 | 2/2001 | Fine et al. | |
| 6,202,114 B1 | 3/2001 | Dutt et al. | |
| 6,219,739 B1 | 4/2001 | Dutt et al. | |
| 6,246,669 B1 * | 6/2001 | Chevalier et al. ........ 370/238 |
| 6,407,985 B1 * | 6/2002 | Jain ........................ 370/256 |
| 6,535,490 B1 * | 3/2003 | Jain ........................ 370/256 |
| 6,628,624 B1 * | 9/2003 | Mahajan et al. ........ 370/256 |
| 6,628,661 B1 * | 9/2003 | Goldman et al. ........ 370/408 |
| 6,678,241 B1 * | 1/2004 | Gai et al. ................ 370/216 |
| 6,697,339 B1 * | 2/2004 | Jain ........................ 370/256 |

OTHER PUBLICATIONS

Interconnections, 2d Ed., Copyright 200, pp. 58-90.
IEEE Standards for Information Technology—Telecommunications and Information Exchange Between Systems—Local and Metropolitan Area Networks— Part 3: Media Access Control (MAC) Bridges, ANSI/IEEE Std 802.1D, 1998 Edition, Copyright 1998, IEEE, pp. 1-355.

* cited by examiner

*Primary Examiner*—Wellington Chin
*Assistant Examiner*—Kevin Mew
(74) *Attorney, Agent, or Firm*—Cesari and McKenna, LLP

(57) ABSTRACT

The Spanning Tree Protocol (STP) chooses a root switch. Each of the other switches has a "root" port and one or more "designated ports(s)" chosen by STP. Packets are transmitted upstream toward the root switch through the root port, and packets designated for downstream switches from the root switch are received by the root port and transmitted through the designated ports. In the invention, an administrator of the core network identifies which switch ports in the core network are boundary ports to customer networks. The administrator designates the boundary ports as "root guard protected" ports (RG ports). The STP then executes as required by the ordinary STP protocol, and if a RG port is selected by the STP to be a root portm then the status of the port is set to "blocked," and no packets are transmitted through the port.

19 Claims, 10 Drawing Sheets

CONFIGURATION MESSAGE

TOPOLOGY CHANGE NOTIFICATION MESSAGE

|  | 700 |
|---|---|
| 702 | 704 |
| STATE | ROLE |
| FWD (710A) | ROOT PORT (710) |
| FWD (712A) | DESIGNATED PORT (712) |
| BLK (714A) | BLOCKED PORT (714) |

PORT STATE TABLE
PRIOR ART

FIG. 7

| STATE | ROLE | |
|---|---|---|
| FWD | ROOT PORT | 710 |
| FWD | DESIGNATED PORT | 712 |
| BLK | BLOCKED PORT | 714 |
| BLK | ROOT INCONSISTENT PORT | 902 |

PORT STATE TABLE

FIG. 9

STATE DIAGRAM FOR STD FOR THE ROOT GUARD ON A PORT

STP ROOT GUARD

FIELD OF THE INVENTION

This invention relates to layer 2 computer networks utilizing a Spanning Tree Protocol (STP), and more particularly to the operation of multiple networks connected by layer 2 switches and using a common Spanning Tree Protocol.

BACKGROUND OF THE INVENTION

It is a common engineering practice for an entity which provides network applications for a number of customers to interconnect the networks using Layer 2 switches. That is, the network is connected as a Layer 2 (L2) network. For example, an Internet Service Provider (ISP) ordinarily has a core network. Each customer has his own customer network. When the networks are interconnected as a Layer 2 network, L2 switches interconnect the ISP core network with each customer's Layer 2 network.

The Spanning Tree Protocol (STP), when executed in the core network, will choose a "root switch". There may be a large number of L2 switches in the core network, and each L2 switch will have a "root port", and one or more "designated ports" chosen by the STP.

The STP chooses the root switch on the basis of an identifier of eight (8) bytes length assigned to each L2 switch. The identifier has a first part of two (2) bytes length assigned by a person such as a network administrator and is called the "priority". The identifier has a second part which is the six (6) byte MAC address of the switch. The STP chooses the switch having the smallest value of identifier as the root switch. The priority is the most significant two bytes of the identifier, and the value given to the priority by a network administrator determines which switch is chosen by STP as the root switch, unless the same priority is assigned to several L2 switches in which case the unique value of the MAC address will determine which switch of the lowest priority is chosen by STP as the root switch.

A problem arises when the layer 2 network of L2 switches extends over networks administered by different people. For example, the ISP core network is administered by the ISP network administrator. Each customer has its own network, and each customer of the ISP has its own network administrator who administrates that customer's network. It is highly desirable that the ISP root switch be placed by the STP within a switch owned by the ISP, and not in a customer's network. In the event that the root switch is placed by STP in the customer's network, then that customer will carry traffic for all other customers of the ISP, and this is an undesirable situation.

The ISP network administrator assigns a priority to switches in the ISP network. Each customer assigns a priority to each switch in that customer's network. As long as the priority assigned by the ISP network administrator is smaller than any priority assigned by a customer to a customer owned switch, the STP will place the root switch inside the ISP network. However, in the event that a customer administrator assigns a smaller priority to one of that customer's switches, the STP will make that customer's L2 switch the root switch.

There is needed a method for insuring that the STP places the root switch within the core network of the Internet Service Provider. More broadly stated, there is a need for a method to insure that STP places the root switch within a designated group of switches in an extended L2 switch network, and not in a switch outside of that designated group of switches.

SUMMARY OF THE INVENTION

The Spanning Tree Protocol (STP) is executed in layer 2 switched computer networks in order to prevent loops from occurring. In networks having interconnected layer 2 switches, the STP chooses one of the switches as the root switch. Each of the other switches has a "root port" and one or more "designated port(s)" chosen by the STP. The root switch is placed at the apex of a logical tree of switches, and the switches communicate by transmitting packets up and down the logical tree.

The root port of a L2 switch is the port through which the switch transmits packets toward the root switch, that is upstream in the logical tree of switches. The designated ports are the ports through which the switch transmits packets downstream in the logical tree of switches to other switches at a lower logical layer in the tree. Some ports of a switch may be put into "blocked" state or role by the STP in order to prevent loops in the L2 network.

In the invention, the administrator, a person, of the core network identifies which ports of switches belonging to the core network are boundary ports to a customer owned network. The administrator of the core network designates the boundary ports as "root guard protected" ports (RG ports). The Spanning Tree Protocol then executes as required by the ordinary STP protocol. Software then checks the role of a RG port. In the event that a RG port is selected by STP as a "designated port", then operation of the network begins with packets being exchanged through that designated port. In the event that the RG port is selected by the STP to be a root port, then the state of the port is set to "blocked", and no packets are transmitted through the port. A notation in an explanatory database giving a reason that the port is set to blocked state is made, that the port is "root guard inconsistent".

The administrator of the core network may then communicate with the administrator of a customer network to inform him that the priority of a customer L2 switch is set too low. The customer's network administrator then may re-set the priority of the L2 switches in the customer network, and when STP again executes within the core network, the port will be selected as a designated port and operation of the network will begin (alternatively a different port will be selected as the designated port and the original port set to blocked, as is commonly done by the STP). Some protocols, for example the Simple Network Management Protocol, SNMP protocol, may automatically inform the administrator of the customer network that his network is blocked from exchanging packets with the core network. In the absence of automatic notification, the administrator of the customer network will notice that the connection to the ISP is not working. The administrator of the customer network will then be told by the ISP administrator that the ISP port is Root Guard Inconsistent, and so the administrator of the customer network will then change the priority settings for the L2 switches within the customer network.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 7 is a port state table of the prior art;

FIG. 9 is a port state table in accordance with the invention;

DETAILED DESCRIPTION

Figure 1:
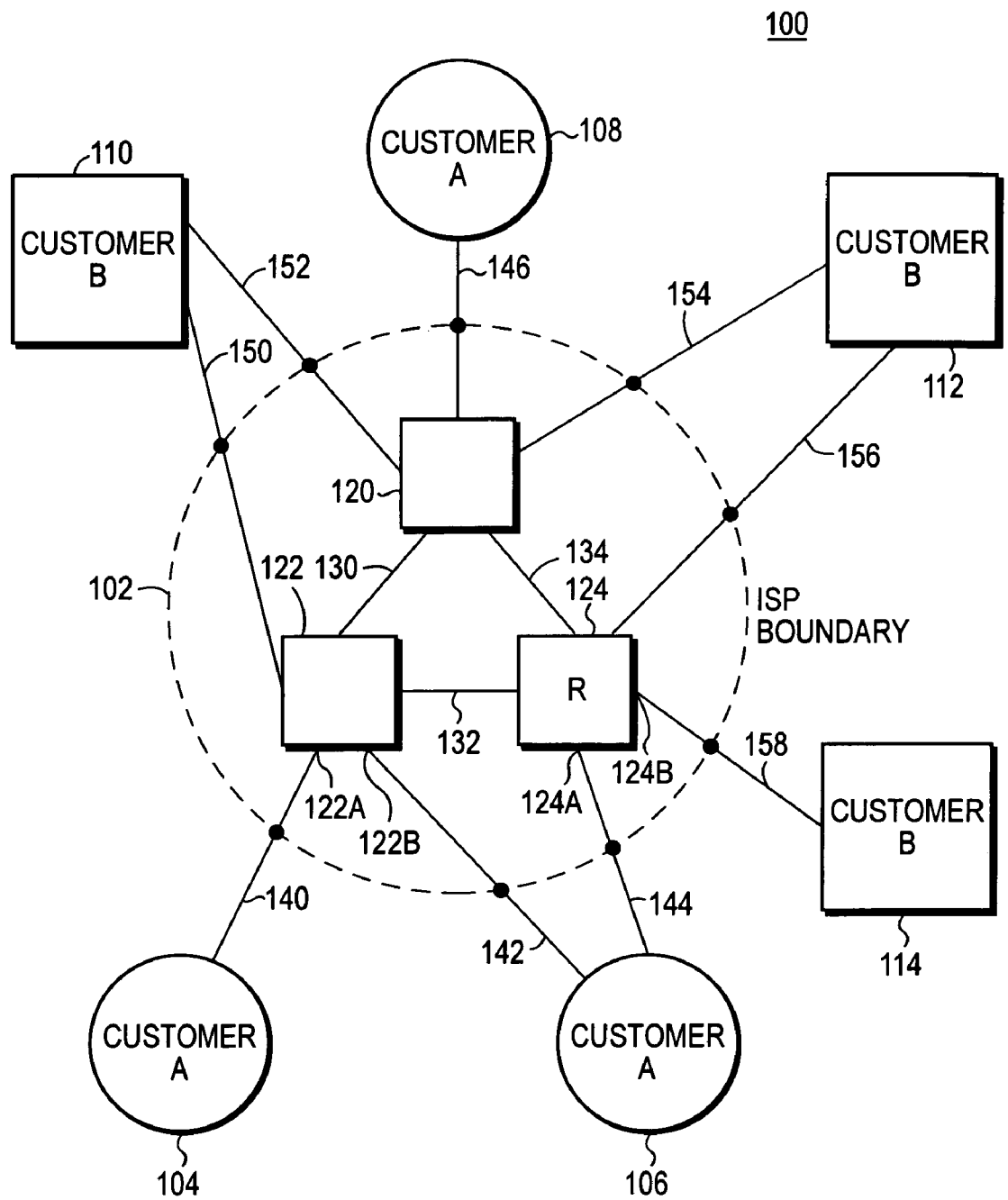
FIG. 1 is a block diagram of a computer network 100, in accordance with the invention.

Turning now to FIG. 1, computer network 100 is shown. Computer network 100 has a core network 102. The boundary of core network 102 is indicated by a dotted circle, which is also marked as "ISP boundary", for example, the boundary of an Internet Service Provider core network.

Other networks not controlled by the owner of core network 102 are connected to the core network. For example, as shown for network 100, there are two customers connected to the core network, customer A and customer B. In an exemplary embodiment of the invention, core network 102 is owned by an Internet Service Provider, ISP. The networks connected to the ISP core network 102 are owned by other parties. In the exemplary computer network 100, there are two customers shown, customer A and customer B. Customer A has three separate customer networks connected to the ISP core network, customer A network 104, customer A network 106 and customer A network 108. Also, for example, customer B is shown having three separate customer networks connected to ISP core network 102. For example, customer B network 110, customer B network 112, and customer B network 114 are all connected to ISP core network 102.

ISP core network 102 is shown representatively as being made up of three layer 2 switches (L2 switches). For example, ISP core network 102 is shown representatively containing L2 switch 120, L2 switch 122, and L2 switch 124. The L2 switches of the ISP core network 102 are interconnected by links between ports of the switches. For example, link 130 connects between switch 120 and switch 122, link 132 connects between L2 switch 122 and L2 switch 124, and link 134 connects between L2 switch 120 and L2 switch 124. These links 130, 132, 134, etc. are all bi-directional.

Customer A network 104 is connected to ISP core network 102 by link 140 to L2 switch 122. Customer A network 106 is connected to ISP core network 102 through link 142 to L2 switch 122. Also, customer A network 106 is connected through link 144 to L2 switch 124. Further, customer A network 108 is connected through link 146 to ISP core network 102 L2 switch 120.

Also, customer B networks 110, 112, 114 are connected through links to the various switches of ISP core network 102. For example, customer B network 110 is connected through link 150 to L2 switch 122, and is connected through link 152 to L2 switch 120. Customer B network 112 is connected through link 154 to L2 switch 120, and is connected through link 156 to L2 switch 124. Customer B network 114 is connected through link 158 to L2 switch 124.

For example, customer A network 104 maybe located in Boston, customer A network 106 may be located in Chicago, and customer A network 108 maybe located in Los Angeles, each of these cities being at least 1,000 miles apart. The ISP core network 102 serves to interconnect these networks of customer A. Further, customer B networks maybe in distant cities, either on the same continent or on different continents. For example, customer B network 110 may be in New York city, customer B network 112 may be in London, England, and customer B network 114 may be in some other major city, for example, Sydney, Australia. Again, ISP core network 102 connects together the various networks of customer B, etc.

Further, ISP core network 102 may connect together various other customer networks in various diverse locations.

The core network 102 and the various customer networks which it interconnects all operate at Layer 2 through interconnection of Layer 2 switches.

The spanning tree algorithm, or spanning tree protocol, is used to prevent the formation of loops in a Layer 2-computer network, for example, a Layer 2 computer network 100.

Figure 2:
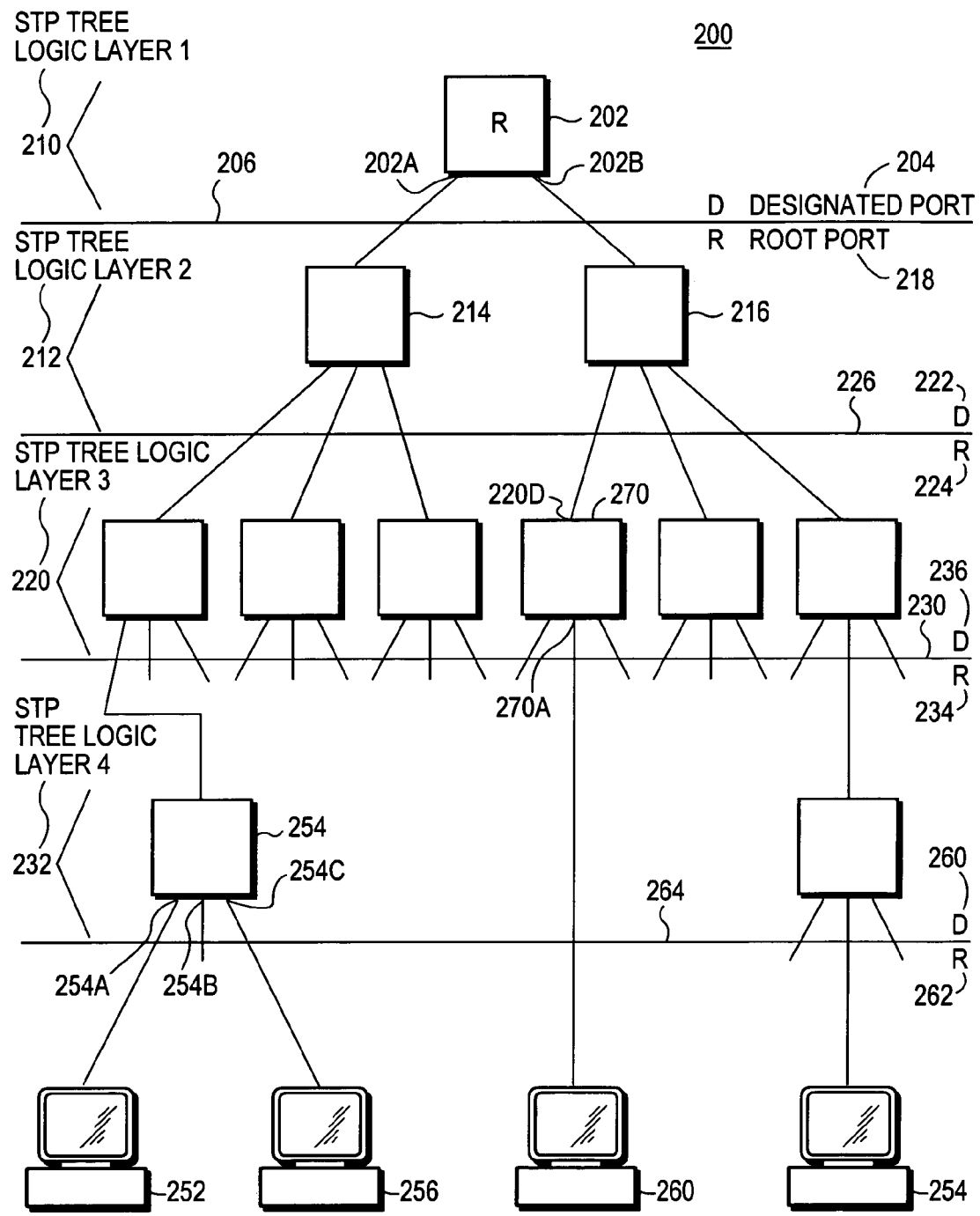
FIG. 2 is a block diagram of a spanning tree topology in accordance with the invention.

Turning now to FIG. 2, a logical tree diagram 200 is shown. The logical tree diagram 200 is generated by the spanning tree protocol executing in L2 switches interconnected to form the Layer 2 switching network 100. The spanning tree protocol chooses a L2 switch as the root switch 202. Root switch 202 contains a "R" indicating that L2 switch 202 has been chosen by the spanning tree protocol as the root switch. The root switch has, for example, two designated ports, as shown in the exemplary logical tree diagram of FIG. 2, port 202A and port 202B. The terminology "D" 204 indicating a designated port above boundary 206 indicates that the ports of the root L2 switch 202 facing "downwardly" are designated ports in the STP ordinary sense. Ports facing upwardly in STP logic tree 200 are set by STP to be root ports.

Root L2 switch 202 is in logical layer one (1) 210 of the logical tree 200. Root L2 switch 202 connects by designated ports 202A, 202B to logic level two (2) 212 L2 switches 214 and L2 switch 216. The designated port of the higher logic level root switch 202 connects to a "root port" of the lower logic level switches 214, 216. The indicia 218 indicates that beneath the boundary 206 in the logic tree, the switches in the next layer down connect by root ports, in the direction of the root switch.

In the exemplary spanning tree logical tree diagram 200, the third logic layer 220 switches connect by their root ports to the designated ports of the logic layer two (2) switches 212, as shown by the indicia D 222 and indicia R 224 at the boundary 226 between logic layer two (2) 212 switches and logic layer three (3) L2 switches 220. Again, the root port of the logical layer three (3) switches 220 connect upstream to the designated ports of the logical layer two (2) 212 switches. The designated ports of logical layer 2 switches are indicated by the indicia "D" 222 at the boundary 226, and the root ports of logic layer three (3) switches 220 are indicated by the indicia "R" 224.

Again, boundary 230 is between logic layer three (3) 220 L2 switches and logic layer four (4) L2 switches 232. Root Ports of the layer four (4) switches 232 connect upstream to the higher layer logical switches of the logic tree. The root ports of the logical layer four (4) L2 switches 232 are indicated by indicia "R" 234 and these root ports of logical layer four (4) L2 switches 232 connect to designated ports of the logical layer three L2 switches 220, as indicated by the indicia "D" 236.

Finally, end station computers such as, for example, end station computer 252 connects to a switch, for example switch 254, at port 254A which is shown representatively in logic layer for four (4) of the STP logic tree 200. Additionally, the other ports 254B and 254C may connect either to end terminal computers, or to additional lower logic layer switches. As indicia "D" 260 indicates, designated ports of logic layer 4 232 L2 switches connect to objects in the next lower logical layer. And when the objects are end station computers, the end station computers simply connect by their port. However, when the objects are further lower logic layer L2 switches, the L2 switches connect by their root port, as indicated by indicia 262.

In accordance with the spanning tree protocol, are end station computer 252 communicates with another end station computer 254 by transmitting messages up-stream through the logical layers of the STP logical tree 200 until a common L2 switch is reached, and the message then is forwarded down the tree to the destination to the computer. For example, the common L2 switch for end station computer 252 and end station computer 254 is the root L2 switch 202. In contrast, end station computer 256 is connected to port 254C of L2 switch 254. Accordingly, end station computer 252 may communicate with end station computer 256 by simply transferring messages through L2 switch 254. As a further example, end station computer 260 is connected to port 270A of L2 switch 270, and L2 switch 270 is at logical layer three (3) 220 of the STP logical tree 200. Accordingly, end station computer 260 may exchange messages with end station computer 254 by transferring messages upstream to L2 switch 216 which then transfers messages downstream to end station computer 254. That is, the common L2 switch between end station computer 260 and end station computer 254 is the logic layer two (2) L2 switch 216.

Returning now to FIG. 1, it is desirable that the spanning tree protocol make a L2 switch within the ISP core network 102, such as L2 switch 124, the root switch. This desirability is shown by the indicia "R" inside the square symbol for L2 switch 124. For example, in the event that end station computer 252 belongs to customer A network 104 and end station computer 254 is located in customer A network 108, it is desirable to have root L2 switch 202 located within the ISP core network 102, for example, at L2 switch 124. When the root switch is located within the ISP core network 102, then customer A traffic from its end station computer 252 to its end station 254 passes through either customer A networks or the ISP core network 104, and does not pass through some other customers network. However, in the event that the STP protocol places the root bridge 202 within a customer B network, for example, customer B network 110, 112, or 114, then customer A network traffic passes through another customer's network. To have a customer's traffic pass through some other customer's network is a very undesirable situation. The present invention avoids this undesirable situation, and places the root bridge within the boundaries of ISP core network 102.

A further requirement on the placement of a root port is that no perimeter port of a switch within the ISP core network 102 be chosen as a root port. Even if the root switch is inside the perimeter of the ISP core network 102, it is possible when large chains of switches are involved, that the path from a root port on the perimeter in a switch inside the perimeter to another switch inside the perimeter will pass through a switch outside of the perimeter. This error condition is avoided by preventing a perimeter port from being chosen as a root port.

Figure 3:
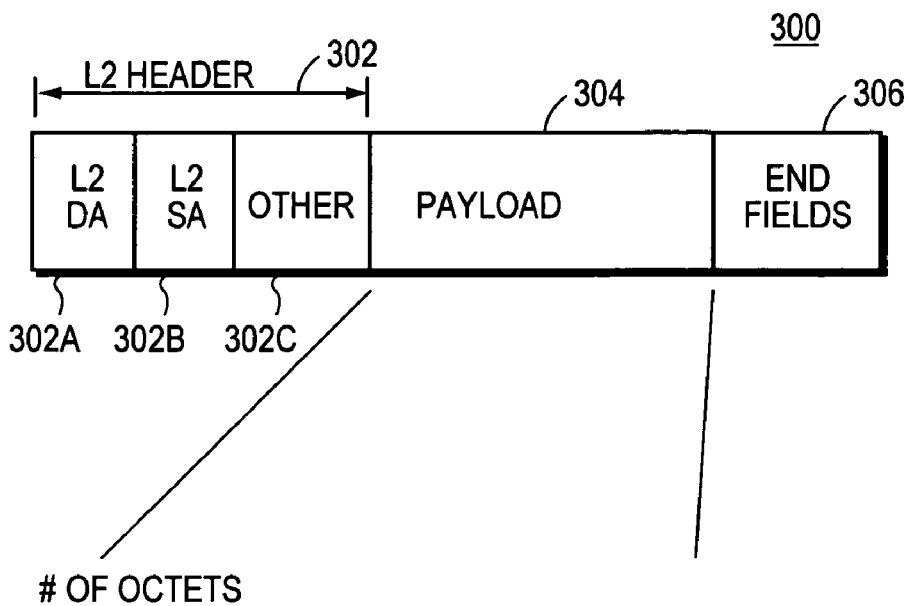
FIG. 3 is a field diagram of a network packet.

Operation of the spanning tree protocol will next be described. Turning now to FIG. 3, a field diagram 300 of a typical layer 2 computer network packet is shown. Computer network packet 300 has a layer 2 header 302, a layer 2 payload 304, and end fields 306. The L2 header 302 has an L2 destination address field (L2 DA field) 302 A, and L2 source address field (L2 SA field) 302 B, and fields 302 C for other layer 2 header fields.

The following description of the spanning tree protocol follows closely the description given by Radia Pearlman in her book *Interrconnections, Second Edition*, published by Addison Wellesley, Copyright date 2000, all disclosures of which are incorporated herein by reference, particularly pages 58–90. In the description by Pearlman of the spanning tree protocol, the switching entities are referred to as "bridges", and this terminology is taken as synonymous with the present terminology of "L2 switch".

Figure 4:
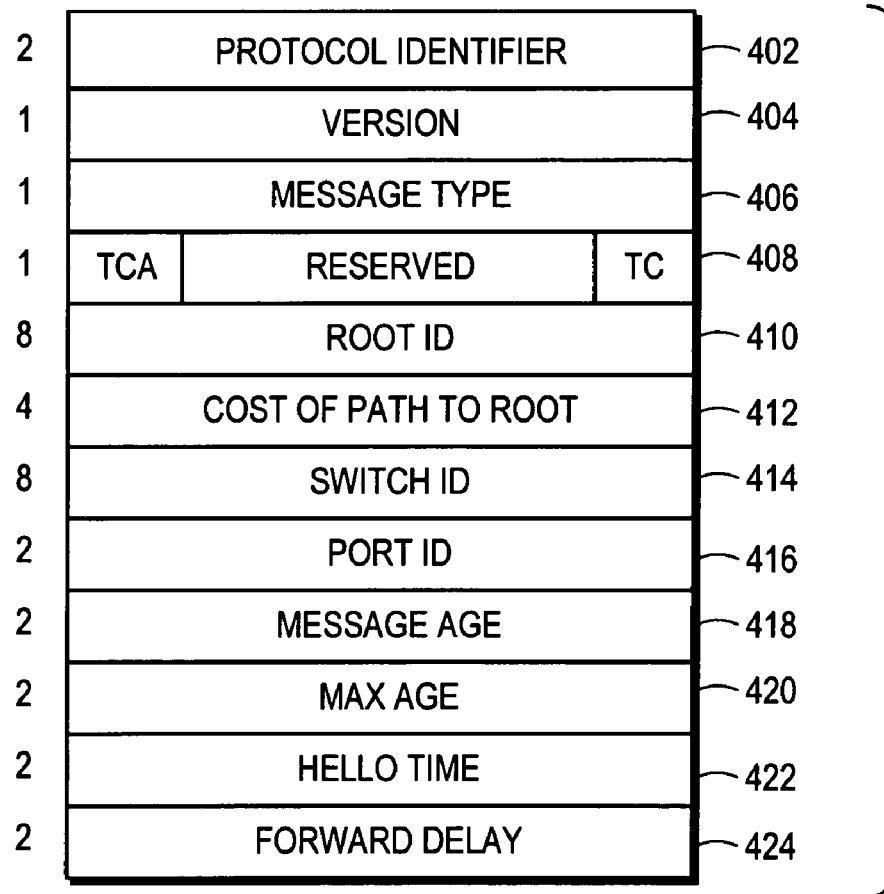
FIG. 4 is a field diagram of a STP configuration message portion of a network packet.

When the computer network packet 300 is used as a configuration message for the spanning tree protocol, the payload field contains the configuration message fields shown in FIG. 4. The number of octets, or bytes, for each field are shown by the numbers at the left of the field. The protocol identifier field 402 is two bytes and has the value "0". The version field 404 is one byte, and has the value "0". The message type field 406 is one byte and has the value "0". The flags field 408 contains two (2) flags. The "TC" field is the least significant bit, and is the topology change field. If "set" in the configuration message received on the root port, it indicates that the receiving L2 change flag switch should use forward delay (a short timer) for aging out station cache entries rather than the aging timer (the normal, longer timer for station cache entries). The "TCA" field, the most significant bit, is the topology change notification acknowledgement. If "set" in the configuration message received on the root port, it indicates that the L2 switch receiving this configuration message no longer needs to inform the parent L2 switch that a topology change has occurred. The parent L2 switch will take responsibility for advising the root L2 switch of the topology change. The remaining bits in the flags field 408 are unused.

The root identification field (ID field) 410 is the important field for the present invention. The root ID field is eight (8) bytes in length. Each L2 switch is configured with a two byte priority, which is added to the six byte identification of the L2 switch. The six byte identification of the L2 switch may be a layer 2 address for one of its ports, or it may be any unique 48 bit address. The 48 bit ID is chosen to be unique for the L2 switch. The priority portion is the numerically most significant portion. The eight (8) byte root ID consists of the priority followed by the 48 bit ID of the L2 switch which is the root L2 switch, assumed to be the root switch by the L2 switch transmitting the configuration message of FIG. 4. The two byte priority is configured by the network administrator, a person, responsible for the L2 switch.

The cost of path to root field 412 is four (4) bytes in length. The cost of path to root is the total cost from the L2 switch that transmitted the configuration message to the L2 switch listed in the root ID field 410.

The switch ID field 414 is 8 bytes in length. This field is two bytes of configured priority followed by the six byte ID of the L2 switch transmitting the configuration message.

The port ID field 416 is two bytes in length. The first byte, that is the most significant byte, is a configurable priority. The second byte is a number assigned by the L2 switch to the port on which the configuration message was transmitted. The L2 switch must assign a locally unique number to each of its ports.

The message age field 418 is the estimated time since the root L2 switch originally transmitted its configuration message, on which the information in this configuration message is based. The estimated time is set out in units of 1/256ths of a second.

The max age field 420 is two bytes in length. The max age field contains the time at which the configuration message should be deleted. This field is also expressed in values of 1/256ths of a second.

The hello time field 422 is two bytes in length. The hello time is the time between generation of configuration messages by the root L2 switch. The hello time is also expressed in 1/256ths of a second.

The forward delay field 424 is the length of time that an L2 switch should stay in each of the intermediate states before transiting a port from "blocking" to "forwarding". The forward delay time is also expressed in 1/256ths of a second.

The purpose of the spanning tree protocol is to have L2 switches dynamically discover a subset of the topology that is loop free, that is it is a logical tree, and yet has enough connectivity so that there is a path between every pair of L2 switches. That is, the tree is "spanning". The L2 switches transmit configuration messages, that is special messages, to each other that allow them to calculate a spanning tree. For example, the configuration message of FIG. 4 is such a configuration message. These configuration messages have the name, "Configuration Bridge Protocol Data Units", or BPDUs, as set up in the IEEE 802.1 standard. The terminology "configuration BPDU" and "configuration message" are synonyms.

The configuration message contains enough information so that an L2 switch can do the following:

1. Elect a single L2 switch, among all the L2 switches interconnected in the computer network to be the "root L2 switch."
2. Calculate the distance of the shortest path from themselves to the root L2 switch.
3. For each local area network in the computer network, elect a designated L2 switch from among those connected to the local area network.
4. Choose a port, known as the "root port", that gives the best path from themselves to the root L2 switch.
5. Select ports to be included in the spanning tree. The ports selected will be the root port plus any ports selected as a designated port for connection to L2 switches at a lower logical level of the spanning tree, or for connection to end station computers.
6. The Layer 2 destination address in L2 DA field 302A is a special multicast address assigned to all L2 switches. The fields and the configuration message which are key to an understanding of establishing the STP spanning tree are: the root ID field 410, which is the identification of the L2 switch assumed to be the root L2 switch; the transmitting Layer 2 switch identification, field 414, which is the identification of the L2 switch initiating this configuration message; and the cost field 412, giving the cost of the least cost path to the root L2 switch from the transmitting L2 switch. This is the best path of which the transmitting L2 switch was aware of the time of initiating transmission of the configuration message.

A L2 switch initially assumes itself to be the root L2 switch, and transmits configuration messages on each of its ports with its ID as root L2 switch, and also as transmitting L2 switch, and "0" as cost 412.

During role negotiations, a L2 switch continuously receives configuration messages on each of its ports, and saves the "best" configuration message from each port. The L2 switch determines the best configuration message by comparing not only the configuration messages received from a particular port, but also the configuration message that the L2 switch would transmit on that port.

The best configuration message is chosen as follows:

Given two (2) a configuration messages, C1 and C2, the following are true.
1. C1 is "better than" C2 if the root ID of field 410 listed in C1 is numerically lower than the root ID listed in C2.
2. If the root ID's are equal, than C1 is better than C2 if the cost listed in C1 is numerically lower than the cost listed in C2.
3. If the root ID's and the costs are equal, then C1 is better than C2 if the transmitting L2 switch ID listed in C1 is numerically lower than the transmitting switch ID listed in C2.
4. If the root ID's, costs, and transmitting bridge ID's are equal, then the port identifier serves as a tie breaker.

A result of executing the spanning tree protocol in the switches of an L2 computer network such as L2 computer network 100, is that the switch having the lowest assigned "priority", the most significant bytes of the root ID field 410, is selected as the root L2 switch. Accordingly, in the event that the network manager for the ISP core network 102 assigns smaller priority values to the ISP switches, then the root L2 switch will be established within the boundaries of the ISP core network ISP 102. However, in the event that a customer network administrator assigns a still lower value, that is a mistaken value, to a priority of a switch in a customer network, the STP will place the root L2 switch 202 within that customers network.

After the role negotiation, a port which is not designated stops sending out BPDUs, and only receives BPDUs from the designated port. Therefore, if a port is not designated, it will receive BPDUs. If the port is designated, it is not supposed to receive any BPDU, unless another switch/port tries to challenge its role, and another negotiation begins.

Figure 5:
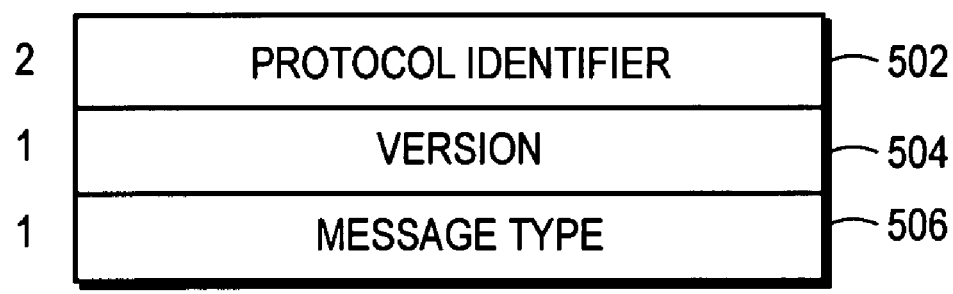
FIG. 5 is a field diagram of a topology change notification message.

A topology change notification message 500, as shown in FIG. 5 is used to assist the spanning tree protocol in maintaining the spanning tree network in the event that a topology change occurs in the network. Details of the use of the topology change notification message 500 are set out by Radia Pearlman in the above-mentioned book *Interconnections Second Edition*, at pages 66–70. The topology change message uses a protocol identifier field 502, containing the value "0". The topology change notification message 500 also uses a version field 504 containing the value "0". The topology change notification message also uses a message type field 506 containing the value "128."

The topology change notification message 500 is used by a L2 switch which determines that a port must be transitioned from "forwarding" to "blocking", or vice versa The L2 switch transmits the topology change notification message upstream through its root port to its parent L2 switch. Finally, the root L2 switch receives a topology change notification message, and sets the TC flag in field 408 in its configuration messages, which it transmits on a periodic basis. Further details of the use of the topology change notification message may be found in the book by Radia Perlman, *Interconnections, Second Edition.*

Figure 6:
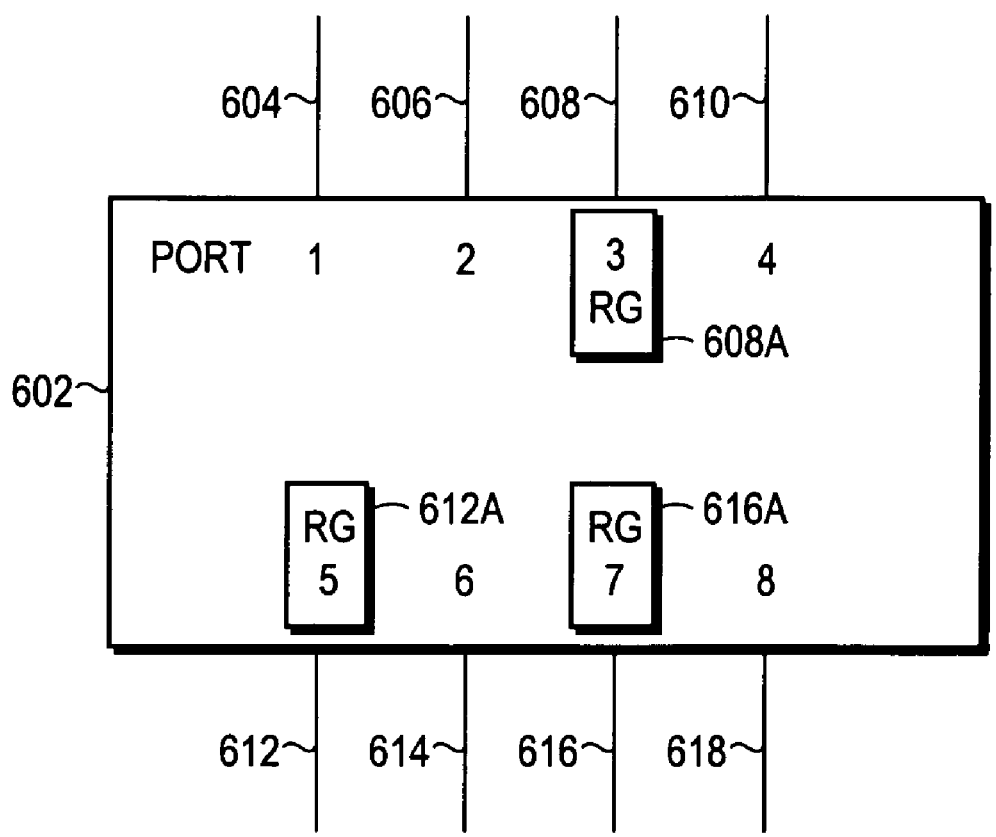
FIG. 6 is a block diagram of a Layer 2 switch, in accordance with the invention.

Turning now to FIG. 6, a block diagram 600 of L2 switch 602 is shown. L2 switch 602 has port "1" 604, port "2" 606, port "3" 608, port "4" 610, port "5" 612, port "6" 614, port "7" 616, and port "8" 618, etc. In accordance with the invention, a few ports of L2 switch 602 have been established as "Root Guard (RG) ports". The RG ports are on the boundary of core Network 102 and connect to customer networks.

For example, port "3" 608 is established as a root guard (RG) port, as is port "5" 612, and port "7" 616, etc. The "root guard" status of ports 608, 612, and 616 are indicated by the blocks containing the indicia RG, for example, block 608A for port "3", block 612A for port "5", and block 616A for port "7", etc.

The status "root guarded", RG, is established by the present invention to prevent the spanning tree protocol from placing the root L2 switch 202 outside of the core network 102.

Simply stated, in the event that the spanning tree protocol selects a root guarded port as a "root port", as shown in spanning tree protocol logic tree 200, then the port is transferred to "blocked" state. In blocked status, no data packets are transmitted or received through the port. That is, if a port is designated as a root guarded port, and if the spanning tree protocol selects that port as a root port, then the port is transferred into "blocked" state and is not used.

The rationale for transferring the root guarded port into "blocked" state in the event that the spanning tree protocol selects it as a root port is that the root guarded ports are the boundary ports between the core network 102 and external networks such as customer networks. In the event that a boundary port is selected as a root port, it may mean that the root L2 switch is outside of the core network 102, or it may mean that the root switch is inside of the ISP core network and a perimeter port has been chosen as a root port. In either event the port is set into "blocked" state.

Referring now to FIG. 7, table 700 is a port "state table" of the prior art. The state of the port is given in column 702. The role of the port is given in column 704. The role of the port is determined by the spanning tree protocol. For example, the spanning tree protocol may select the port as a root port as shown in entry 710. In the event that the port is selected as a root port, then the state of the port is set "forwarding", as shown at entry 710A. In the event that the spanning tree protocol selects the port as a designated port, as shown in entry 712, the port is set to the state "forwarding" as shown by entry 712A.

In the event that a port is set to the role "blocked port" as shown at entry 714, the state of the port is set to "blocking", as shown at entry 714A. Ports are set to "blocking" state by STP in order to avoid loops in the L2 switched network. The state of the port as set forth in table 700 is determined by the spanning tree protocol.

Figure 8:
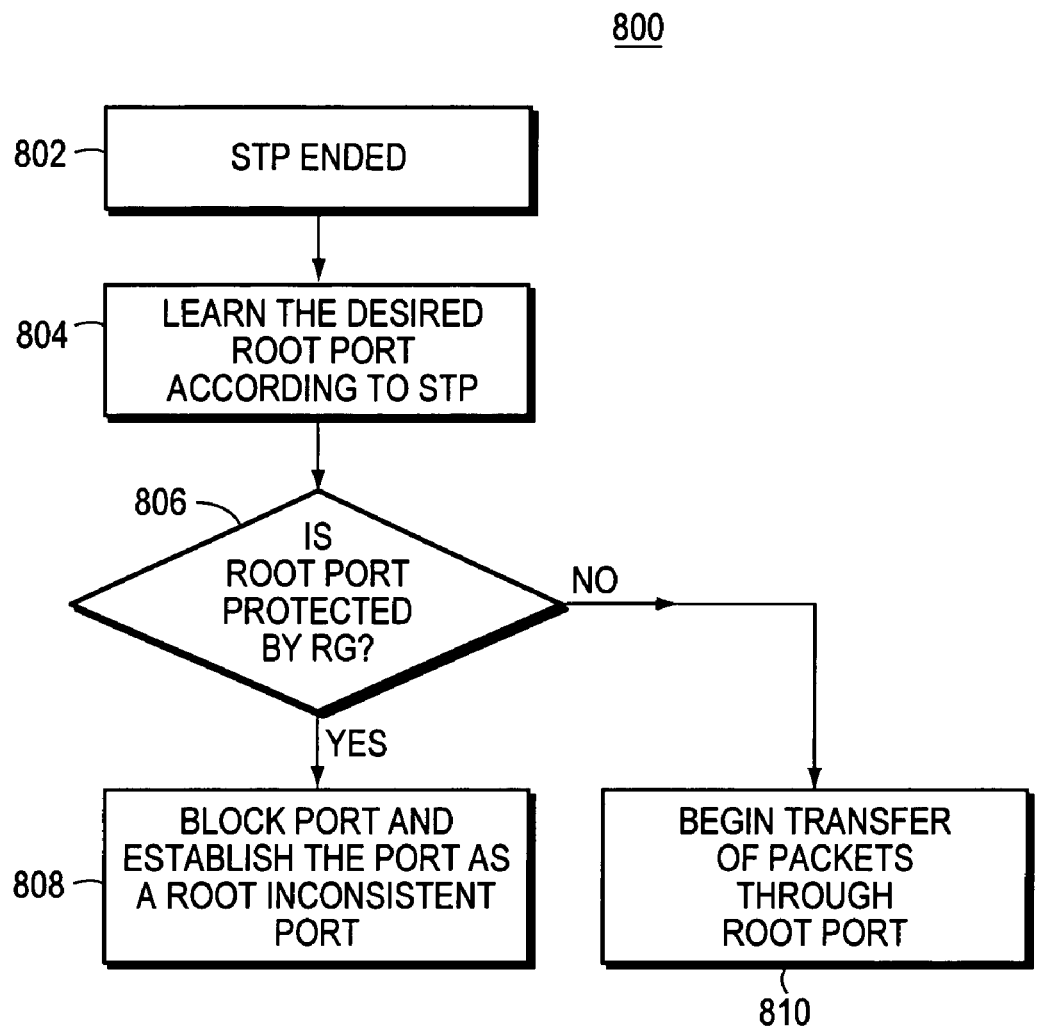
FIG. 8 is a flow diagram of a process in accordance with the invention.

Turning now to FIG. 8, a flow chart of process 800 in accordance with the invention is shown. In process 800 additions are made to the port state table as shown in FIG. 9. The additions of the process 800 are of a new and inventive nature in order to solve the problem of the spanning tree protocol incorrectly placing the root L2 switch outside of the core network 102.

In discussing process 800 of establishing root guard for ports on the boundary between core network 102 and a customer network, the concept of a "boundary port" will be introduced. For example, port 122A is a boundary port between core network 102 and customer A network 104, where the boundary port is the port of the core network L2 switch connected to the customer A network.

Further, port 122B is a boundary port of L2 switch 122 connected to customer A network 106. Still further, port 124A is a boundary port of L2 switch 124 to customer A network 106. Still further, port 124B is a boundary port of L2 switch 124 to customer B network 114. That is, a boundary port is a port of a L2 switch within core network 102, where that port connects to a customer network.

Turning now to the process 800 shown in the flow diagram of FIG. 8, at block 802 it is determined that a spanning tree protocol process has ended. Block 802 contains the notation "STP ended", meaning that a spanning tree protocol process has executed and has ended. From block 802 the process goes to block 804.

At block 804 the process 800 learns the "desired" root port of the L2 switch according to the spanning tree protocol. From block 804 the process 800 goes to block 806.

At block 806 the question is asked: "Is the desired root port protected by root guard?" In the event that the answer is yes, the root port is protected by root guard, the process goes to block 808 where the state of the desired root port is set to "blocked" state. That is, the port is set to "blocked" state shown in entry 902A of port state table 900 of FIG. 9.

In the event that the question at block 806 is answered no, the root port is not protected by root guard, the process goes to block 810 and begins transfer of packets through the root port. That is, normal operation of the spanning tree is established.

The ports guarded by root guard, as shown in FIG. 6, are boundary ports to customer networks. When a boundary port to a customer network is selected by STP as a root port, that port is transitioned into the "blocked" state at block 808 of the process 800. As a result, the desired root port does not become the actual root port, and a different root port must be selected.

Referring now to the spanning tree shown in FIG. 2, if a boundary port is a root port, the meaning is that the root L2 switch 202 is outside of the core network 102. This is because the spanning tree protocol executed in the core network 102 and in the customer networks, as these networks are connected as on extended L2 switch network. The purpose of the invention is to prevent execution of the spanning tree protocol to select a boundary port of core network 102 as the root port for the L2 switch having the boundary port, by blocking any boundary port selected as the root port of the L2 switch.

Turning now to FIG. 9, port table 900 in accordance with the present invention is shown. Prior art entries 710 for the root port, 712 for each designated port, and 714 for a blocked port are shown. Entry 902, in accordance with the present invention is shown for a "root inconsistent port". The state of the root inconsistent port is shown at entry 902A to be "blocking". A root inconsistent port is established, for example, at block 808 of process 800.

The establishment of a port as a "root inconsistent port" by the present invention is done when a "root guarded" port is selected by the spanning tree protocol as a "desired root port".

Figure 10:
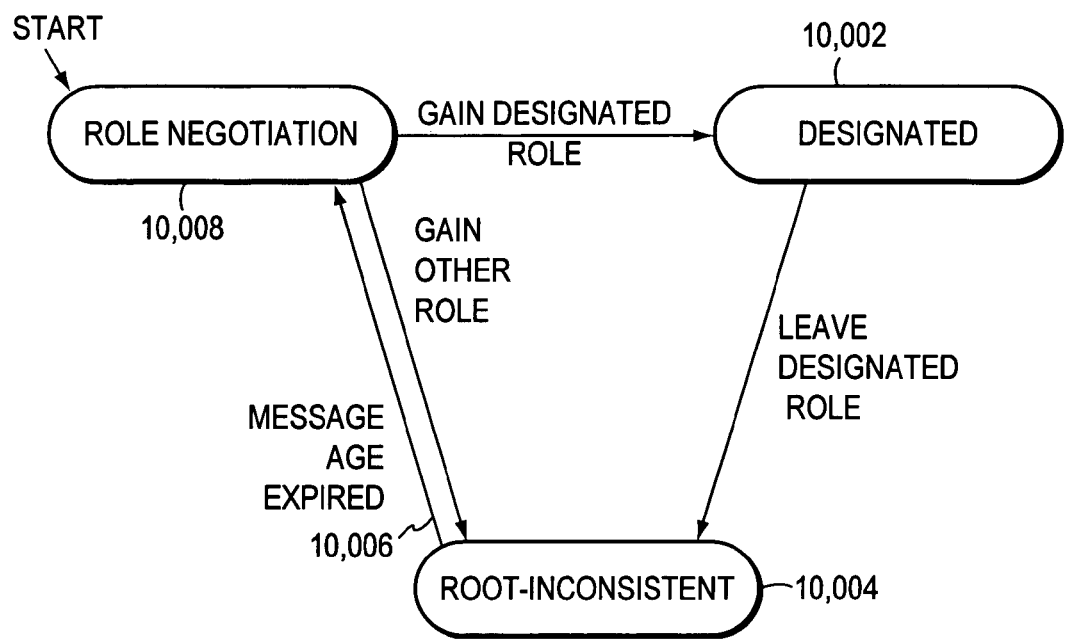
FIG. 10 is a state diagram of a Layer 2 switch in accordance with the invention.

A state diagram of a port when the root guard protection of the present invention is enabled is shown in FIG. 10. When a new port is added, it starts the regular STP negotiation exchanging BPDU's with the port to which it is connected. If the negotiations end by leaving the port with the designated port role, at block 10,002 and therefore eventually in the "forwarding state", then the port behaves like a regular port.

However, if instead the negotiation brings the port into a different role such as a "root port" role with forwarding state, or a "blocked port" role with a blocking state, and if the port is protected by root guard, then the port is moved into the "root inconsistent" state, as shown at entry 902 of port state table 900. The message age timer is started as soon as the "root inconsistent" state is entered at block 10,004, and it is restarted each time a BPDU is received, which confirms the wrong role of the port. If the message age timer expires as at transition 10,006, then the port can leave the "root inconsistent" state and start the role negotiation again from the listening state of role negotiation at block 10,008.

If for any reason the root guard protection is disabled while a port is in the "root inconsistent" state, then the port restarts from the listening state of role negotiation at block 10,008. Disabling the root guard feature does not effect ports which are not in the root inconsistent state.

A pseudo code description of the process for establishing Root Guard for a port follows.
End User Interface
Syntax
The new command required to enforce the root guard on a port is:
Set spantree rootguard <enable/disable> <mod/port>
Description
Command to show the state of the feature
Default value
Rootguard is disabled by default.
Syntax
show spantree rootguard [ <mod/port> I <vlan> ]
Description
The show span tree rootguard command is added to existing code because the old command "show span tree" itself does not have facility to show root guard settings.
The indicated syntax includes the meaning that it is possible to specify a port (or a list of ports) and it is possible to specify a VLAN, but it is not possible to specify both.
The default VLAN is VLAN 1 and the default port list is "all the ports" in the specified or default VLAN.

EXAMPLE

A possible implementation to show the flag follows:
Console> (Enable) Show Spantree Rootguard

| Port | Vlan | Port-State | Root guard |
|------|------|------------|------------|
| 1/1 | 1 | root-inconsistent | enabled |
| 1/2 | 1 | not-connected | disabled |
| 2/1 | 1 | not-connected | disabled |
| 2/2 | 1 | forwarding | disabled |
| ... | ... | ... | ... |

Console> (Enable) Show Spantree Rootguard 1/1–2, 4/2

| Port | Vlan | Port-State | Root guard |
|------|------|------------|------------|
| 1/1 | 1 | root-inconsistent | enabled |
| 1/2 | 1 | not-connected | disabled |
| 4/2 | 1 | forwarding | enabled |

Console> (Enable) Show Spantree Rootguard 3

| Port | Vlan | Port-State | Root guard |
|------|------|------------|------------|
| 3/4 | 3 | not-connected | disabled |
| 5/1 | 3 | root-inconsistent | disabled |
| 5/2 | 3 | forwarding | disabled |
| 5/3 | 3 | forwarding | enabled |

Syslog Messages

New syslog messages are required to notify the user of the actions taken by the new root guard feature:

The following message will be printed when the feature is enabled or disabled on a port:
console> (enable) SPANTREE-5-ROOTGUARDENABLE: rootguard is now [enabled/disabled] for port [mNo]/[pNo]

The following message will be printed when a port with the root guard enabled leaves the designated role:
console> (enable) SPANTREE-2-ROOTGUARDBLOCK: port [mNo]/[pNo] tried to become non-designated in vlan [vlanNo]. Moved to root-inconsistent state.

The following message will be printed when a port with the root guard enabled returns to STP after being/been in the root-inconsistent state:

console> (enable) SPANTREE-4-ROOTGUARDUNBLOCK: port [mNo]/[pNo] restored in vlan [vlanNo]
SNMP and MIB
Add in a new MIB group in STP.EXTENSION.MIB
stpxRootGuardConfigTable OBJECT-TYPE
    SYNTAX           SEQUENCE OF StpxRootGuardConfigEntry
    MAX-ACCESS    not-accessible
    STATUS           current
    DESCRIPTION
    "A table containing a list of the ports for which Spanning Tree RootGuard capability is configured."
    ::= { stpxRootGuardObjects 1 }
stpxRootGuardConfigEntry OBJECT-TYPE
    SYNTAX           StpxRootGuardConfigEntry
    MAX-ACCESS    not-accessible
    STATUS           current
    DESCRIPTION
    "A port for which Spanning Tree RootGuard capability is configured."

-continued

```
    INDEX { stpxRootGuardConfigPortIndex }
        ::= { stpxRootGuardConfigTable 1 }
StpxRootGuardConfigEntry ::= SEQUENCE {
    stpxRootGuardConfigPortIndex      INTEGER,
    stpxRootGuardConfigEnabled        Truth Value
    }
stpxRootGuardConfigPortIndex OBJECT-TYPE
    SYNTAX              INTEGER (1..65535)
    MAX-ACCESS          not-accessible
    STATUS              current
    DESCRIPTION
    "The value of dot1dBasePort (i.e. dot1dBridge.1.4) for the bridge port."
REFERENCE
    "dot1dBasePort is defined in RFC1493."
        ::= { stpxRootGuardConfigEntry 1 }
stpxRootGuardConfigEnabled OBJECT-TYPE
    SYNTAX              Truth Value
    MAX-ACCESS          read-write
    STATUS              current
    DESCRIPTION
    "An indication of whether the RootGuard capability is enabled on this port or not."
    DEFVAL { false }
        ::= { stpxRootGuardConfigEntry 2 }
stpxRootInconsistencyTable OBJECT-TYPE
    SYNTAX              SEQUENCE OF StpxRootInconsistencyEntry
    MAX-ACCESS          not-accessible
    STATUS              current
    DESCRIPTION
    "A table containing a list of the ports for which a particular VLAN's Spanning Tree has
been found to have a root-inconsistency."
        ::= { stpxRootGuardObjects 2 }
stpxRootInconsistencyEntry OBJECT-TYPE
    SYNTAX              StpxRootInconsistencyEntry
    MAX-ACCESS          not-accessible
    STATUS              current
    DESCRIPTION
        "A VLAN on a particular port for which a Spanning Tree root-inconsistency is
    currently in effect."
    INDEX { stpxRootInconsistencyVlanIdex,
        stpxRootInconsistencyPortIndex }
            ::= { stpxRootInconsistencyTable 1 }
    StpxRootInconsistencyEntry ::= SEQUENCE {
        stpxRootInconsistencyVlanIndex      VlanIndex,
        stpxRootInconsistencyportIndex      INTEGER,
        stpxRootInconsistencyState          Truth Value
    }
stpxRootInconsistencyVlanIndex OBJECT-TYPE
    SYNTAX              VlanIndex
    MAX-ACCESS          not-accessible
    STATUS              current
    DESCRIPTION
        "The VLAN id of the VLAN."
        ::= { stpxRootInconsistencyEntry 1 }
stpxRootInconsistencyPortIndex OBJECT-TYPE
    SYNTAX              INTEGER (1..65535)
    MAX-ACCESS          not-accessible
    STATUS              current
    DESCRIPTION
        "The value of dot1dBasePort (i.e. dot1dBridge.1.4) for the bridge port."
    REFERENCE
        "dot1dBasePort is defined in RFC1493."
            ::= { stpxRootInconsistencyEntry 2 }
stpxRootInconsistencyState OBJECT-TYPE
    SYNTAX              Truth Value
    MAX-ACCESS          read-only
    STATUS              current
    DESCRIPTION
        "Indicates whether a port on a particular VLAN is currently in root-inconsistent state
    or not."
        ::= { stpxRootInconsistencyEntry 3 }
Add in a notification for root inconsistency state changes
stpxRootInconsistencyUpdate NOTIFICATION-TYPE
    OBJECTS             { stpxRootInconsistencyState }
    STATUS              current
    DESCRIPTION
        "A stpxRootInconsistencyUpdate notification is sent by a bridge when an instance of
    stpxRootInconsistencyState is created or destroyed. That is, when an root-inconsistency is
    discovered in the VLAN's Spanning Tree for a particular port, or when such a root-
    inconsistency disappears."
        ::= { stpxNotificationsPrefix 2 }
```

-continued

```
Add in conformance statements
    stpxMIBCompliance3   MODULE-COMPLIANCE
        STATUS           current
        DESCRIPTION
            "The compliance statement for entities which implement STP Extensions MIB."
        MODULE --this module
            -- no MANDATORY-GROUPS
            GROUP            stpxRootGuardGroup
            DESCRIPTION "This group is mandatory for implementations of the RootGuard
        capability."
            GROUP            stpxRootInconsistencyNotificationsGroup
            DESCRIPTION      "The notifications which a STP extension implementation
            required to implement."
                ::= { stpxMIBCompliances 3 }
Add in 2 units of conformance
stpxRootGuardGroup OBJECT-GROUP
    OBJECTS  {           StpxRootGuardConfigEnabled,
                         StpxRootInconsistencyState
             }
    STATUS   current
    DESCRIPTION
        "A collection of objects to support root guard capabilities."
            ::= { stpxMIBGroups 6 }
stpxRootInconsistencyNotificationsGroup NOTIFICATION-GROUP
    NOTIFICATIONS      { stpxRootInconsistencyUpdate }
    STATUS             current
    DESCRIPTION
        "The notifications which a STP root guard implementation is required to
    implement."
        ::= { stpxMIBGroups 7 }
```

Figure 11:
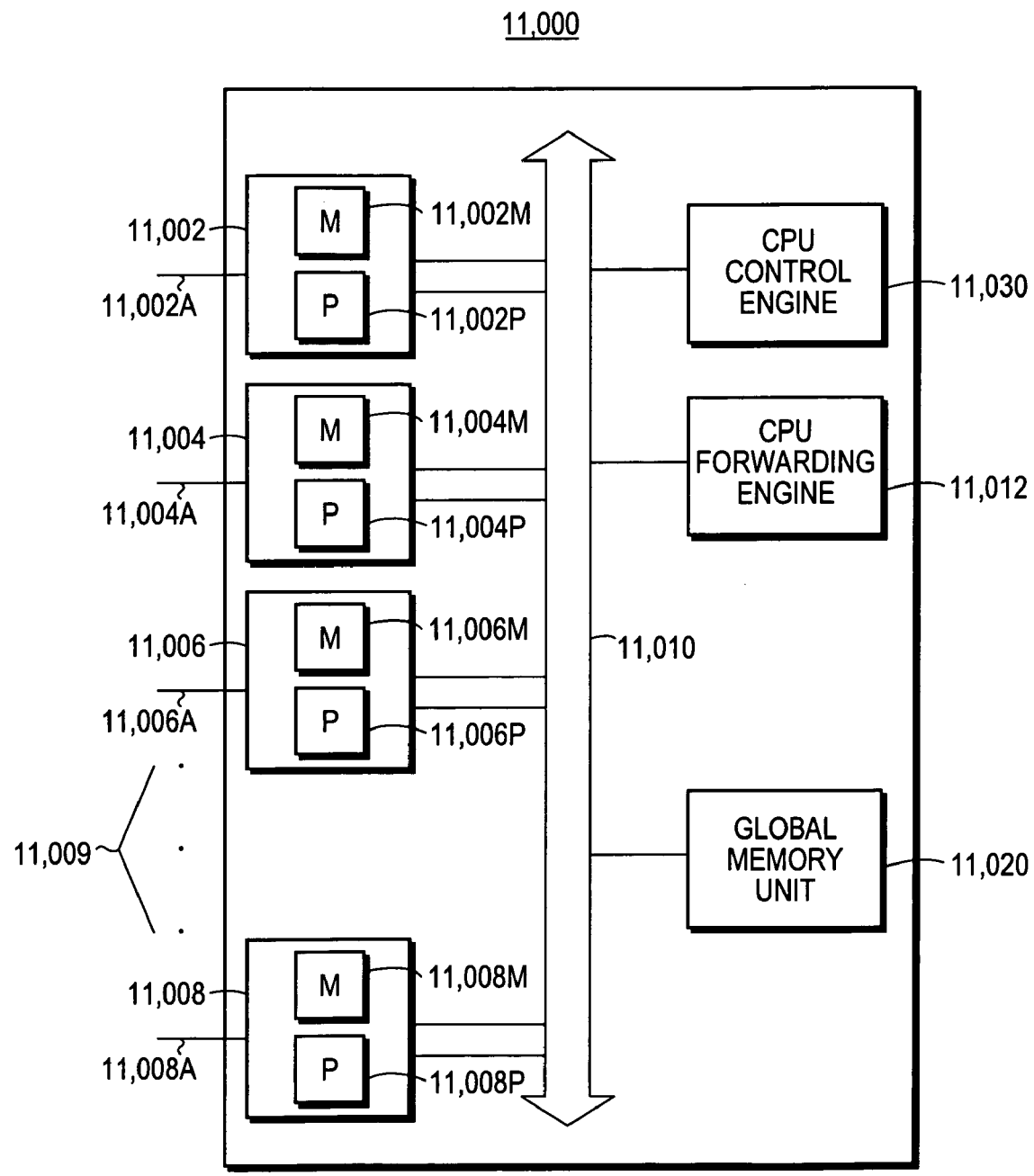
FIG. 11 is a block diagram of a Layer 2 switch in accordance with the invention.

Turning now to FIG. 11, block diagram 11,000 of a representative hardware structure for internal operation of a Layer 2 switch is shown. Each linecard 11,002, 11,004, . . . 11,008 supports a port. For example, linecard 11,002 has port 11,002A; linecard 11,004 has port 11,004A; linecard 11,006 has port 11,006A, . . . and linecard 11,008 has port 11,008A, etc. Each linecard has a memory unit. For example, linecard 11,002 has memory unit 11,002M, linecard 11,004 has memory unit 11,004M, linecard 11,006 has memory unit 11,006M . . . and linecard 11,008 has memory unit 11,008M, etc. Each line card has a processor P, indicated by blocks 11,002P, 11,004P, 11,006P, . . . 11,008P, etc. The various linecards are interconnected by switch fabric 11,010. Switch fabric 11,010 may be, for example, a crossbar type switch fabric, an ATM based switch fabric, or may be simply a computer bus. A central processor unit forwarding engine 11,012 also attaches to switch fabric 11,010. In operation, a packet arrives at a port of a linecard and is transferred by switch fabric 11,010 to memory units in the required linecards. Ports 604, 606, 608, 610, 612, 614, 618, etc. are implemented on linecards 11,002, through 11,008 etc.

Further, CPU control engine 11,030 attaches to switch fabric 11,010. CPU control engine 11,030 is used to execute various control protocols for the network device. For example, CPU control engine 11,030 may be used to execute the Spanning Tree Protocol, the Link State Routing Protocol, the Root Guard protocol, the OSPF protocol, the IGRP protocol, the EIGRP protocol, etc. Execution of a process in a CPU is often referred to as "running" the process. Data read from various fields of a received packets are transferred to CPU control engine 11,030. Then CPU control engine exercises control of the network device through switch fabric 11,010, through control lines not shown in FIG. 11, etc. CPU control engine 11,030 may execute the software to implement the spanning tree protocol, and the process of the invention as illustrated in the flow chart of FIG. 8. Alternatively, the processes of the spanning tree protocol and the process of the flow chart of FIG. 8 may be executed, in whole or in part, in the processors on the linecards, processors 11,002P, through 11,008P, etc.

For example, in the event that a packet is received from an external connection at port 11,002A, the packet arrives at port 11,002A, is stored in memory unit 11,002M, and is simultaneously transmitted on switch fabric 11,010 to all of the other linecards, where the packet is stored in the memory unit of each of the other linecards. The memory 11,002M in the receiving linecard is necessary as a buffer in the event that switch fabric 11,010 is busy at the time that the packet arrives at port 11,002A. Processors 11,002P, 11,004P, 11,006P, . . . 11,008P, etc. on each linecard receive information from circuits on the linecard interpreting fields of the packets as the packet is being received.

In an exemplary embodiment of the invention, processors 11,002P, 11,004P, 11,006P, . . . 11,008P, etc. on the individual linecards act as forwarding engines and make decisions concerning the ports through which the packet is to be transmitted.

In an alternative exemplary embodiment of a Layer 2 switch, as the packet is being transferred on switch fabric 11,010 to all of the other linecards, fields of the packet are interpreted by circuitry in the receiving linecard, information is transferred to CPU forwarding engine 11,012, and CPU 11,012 makes decisions concerning which ports the packet is to be transmitted out through. Once CPU 11,012 makes a decision as to which ports the packet should be forwarded through, CPU 11,012 asserts control lines (not shown in FIG. 11) which grant permission to the appropriate linecards to transmit the packet out through that linecard's port.

In an alternative embodiment of the invention, a linecard may support a plurality of ports rather than only one port as is shown in FIG. 11. Three dots 11,009 indicate that a large number of linecards may be supported by the Layer 2 switch.

The exemplary internal architecture of a typical Layer 2 switch as shown in block diagram 11,000 permits line speed transfer of an incoming packet to one or more outgoing ports, simultaneously with receipt of the packet. Only a small delay is encountered, depending upon factors, for example, the state of switch fabric 11,010 as the packet is received at its incoming port, and the delay imposed by ordinary switch fabric transfer processes along switch fabric 11,010.

In an alternative exemplary design of a Layer 2 switch, a linecard may transfer an incoming packet to global memory unit 11,020. CPU 11,012 reads fields of the packet and decides which linecards must transmit the packet. After the packet is received into global memory 11,020, the packet is read by each linecard which must transmit the packet, and then the packet is transmitted by the linecards. In either event, the hardware reads the fields of the appropriate Layer, and responds by making the appropriate decision.

It is to be understood that the above described embodiments are simply illustrative of the principles of the invention. Various other modifications and changes may be made by those skilled in the art which embody the principles of the invention and fall within the spirit and scope thereof.

What is claimed is:

1. A layer 2 switch, comprising:
    a plurality of ports, at least one port of said plurality of ports capable of being set to a status of root guard protected (RG status);
    first circuits for running the spanning tree protocol (STP) in said layer 2 switch, said STP capable of selecting said at least one port as either a designated port or as a root port;
    second circuits for running root guard protocol, and said root guard protocol determining whether or not a port set to RG status has been selected by STP as a root port; and,
    blocking circuits to set said at least one port into blocked status, said blocking circuits setting said at least one port into blocked status in response to said at least one port being both in root guard protected status and selected by STP as a root port.

2. A method of managing a switch for use in a computer network, comprising:
    providing a plurality of ports, at least one port of said plurality of ports capable of being set to a status of root guard protected (RG status);
    setting said at least one port to RG status;
    running a spanning tree protocol (STP) in said switch, said STP capable of selecting said at least one port as either a designated port or as a root port;
    running root guard protocol, and said root guard protocol determining whether or not a port set to RG status has been selected by STP as a root port; and,
    setting said at least one port into blocked status, in response to said at least one port being both in root guard protected status and selected by STP as a root port.

3. A method of managing a switch for use in a computer network, comprising:
    providing a plurality of ports, at least one port of said plurality of ports capable of being set to a status of root guard protected (RG status);
    setting said at least one port to RG status;
    running a spanning tree protocol (STP) in said switch, said STP capable of selecting said at least one port as either a designated port or as a root port;
    determining whether or not said at least one port set to RG status has been selected by STP as a root port;
    setting said at least one port into blocked status in response to said at least one port being both in root guard protected status and selected by STP as a root port.

4. A computer network having a core network and a plurality of customer networks connected thereto by a perimeter port of a perimeter switch in said core network, said perimeter port being connected to a port of a switch in a customer network of the plurality of customer networks, said computer network comprising:
    a first process for setting said perimeter port to a status of root guard protected (RG status);
    a second process for running the spanning tree protocol (STP) in said perimeter switch, said STP capable of selecting said perimeter port as either a designated port or as a root port;
    a third process for executing a root guard protocol, said root guard protocol determining whether or not a port set to RG status has been selected by STP as a root port; and,
    a fourth process for setting said perimeter port into blocked status in response to said perimeter port being both in root guard protected status and selected by STP as a root port.

5. A computer network, comprising:
    means for establishing said computer network as having a core network and a plurality of customer networks connected thereto by a perimeter port of a perimeter switch in said core network, said perimeter port being connected to a port of a switch in a customer network of the plurality of customer networks;
    means for setting said perimeter port to a status of root guard protected (RG status);
    means for running the spanning tree protocol (STP) in said perimeter switch, said STP capable of selecting said perimeter port as either a designated port or as a root port;
    means for executing a root guard protocol, said root guard protocol determining whether or not a port set to RG status has been selected by STP as a root port; and,
    means for setting said perimeter port into blocked status in response to said perimeter port being both in root guard protected status and selected by STP as a root port.

6. A method for operating a computer network switch, said computer network switch having a perimeter port connected to a second switch, comprising:
    setting said perimeter port to a status of root guard protected (RG status);
    running a spanning tree protocol (STP) in said computer network switch, said STP capable of selecting said perimeter port as either a designated port or as a root port;
    executing a root guard protocol, said root guard protocol determining whether or not a port set to RG status has been selected by STP as a root port; and,
    setting said perimeter port into blocked status in response to said perimeter port being both in root guard protected status and selected by STP as a root port.

7. The method of claim 6, further comprising:
    executing a process in a CPU control engine to set said perimeter port to a status of root guard protected;
    executing a process in said CPU control engine to run said spanning tree protocol; and, executing a process in said CPU control engine to execute said root guard protocol.

8. A computer readable memory device, comprising: said computer readable memory device containing instructions for execution by a processor for practice of the method of claim 6.

9. Electromagnetic signals propagated over a computer network, said electromagnetic signals having instructions for execution by a processor for practice of the method of claim 6.

10. The computer network of claim 4, wherein two or more processes of said first process, second process, third process and fourth process are the same process.

11. A method for operating a switch for use in a computer network, comprising:
- setting at least one port of said switch to root guard protected status (RG status);
- running a spanning tree protocol (STP) capable of selecting said at least one port as either a designated port or as a root port;
- determining whether or not a port set to RG status has been selected by STP as a root port; and,
- setting said at least one port into blocked status, in response to said at least one port being both in RG status and selected by STP as a root port.

12. A switch, comprising:
- means for setting at least one port of said switch to root guard protected status (RG status);
- means for running a spanning tree protocol (STP) capable of selecting said at least one port as either a designated port or as a root port;
- means for determining whether or not a port set to RG status has been selected by STP as a root port; and,
- means for setting said at least one port into blocked status, in response to said at least one port being both in RG status and selected by STP as a root port.

13. A switch, comprising:
- a processor; and
- a memory configured to store instructions for execution by said processor, said instructions for performing the steps of:
  - setting at least one port of said switch to root guard protected status (RG status);
  - running a spanning tree protocol (STP) capable of selecting said at least one port as either a designated port or as a root port;
  - determining whether or not a port set to RG status has been selected by STP as a root port; and,
  - setting said at least one port into blocked status, in response to said at least one port being both in RG status and selected by STP as a root port.

14. The switch of claim 13, wherein said processor resides on a linecard in said switch.

15. The switch of claim 13, wherein said processor resides on a central processing unit in said switch.

16. The switch of claim 13, wherein said memory is located on a linecard in said switch.

17. The switch of claim 13, wherein said memory is located in a global memory unit in said switch.

18. A switch, comprising:
- a plurality of ports, at least one port of said plurality of ports capable of being set to a status of root guard protected (RG status);
- first circuits for running the spanning tree protocol (STP) in said switch, said STP capable of selecting said at least one port as either a designated port or as a root port;
- second circuits for running root guard protocol, and said root guard protocol determining whether or not a port set to RG status has been selected by STP as a root port; and,
- blocking circuits to set said at least one port into blocked status, said blocking circuits setting said at least one port into blocked status in response to said at least one port being both in root guard protected status and selected by STP as a root port.

19. A switch, comprising:
- a memory configured to store a data structure containing one or more entries, said entries having a "state" field and a "role" field, said state field having a value of "blocked" or a value of "forwarding", said data structure having,
  - a first entry having the role field set to "root port" and the state field set to forwarding;
  - a second entry having the role field set to "designated port" and the state field set to forwarding;
  - a third entry having the role field set to "blocked port" and the state field set to blocked; and,
  - a fourth entry having the role field set to "root inconsistent port" and the state field set to blocked; and,
- a processor to write and read said data structure in implementing a root guard protocol.

* * * * *